(No Model.)
T. H. WILLIAMS.
POTATO PLANTER.
No. 594,669.
Patented Nov. 30, 1897.
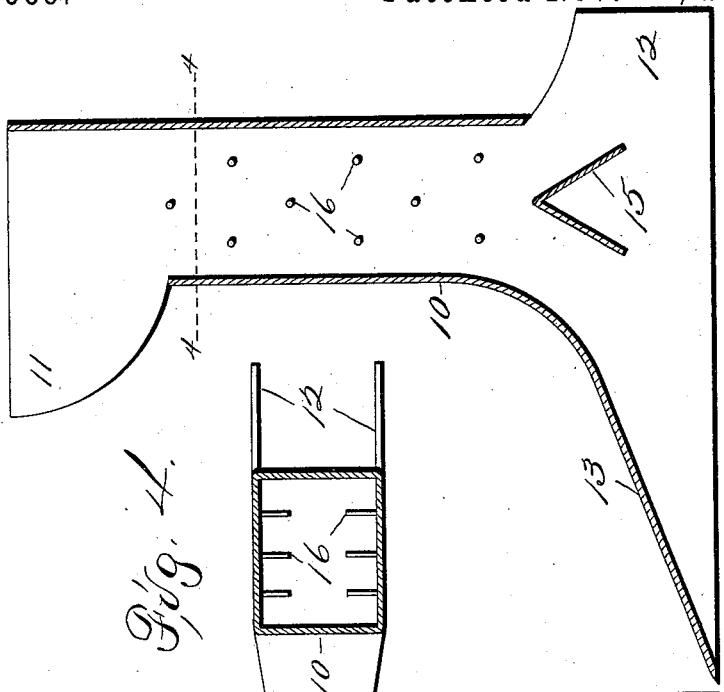
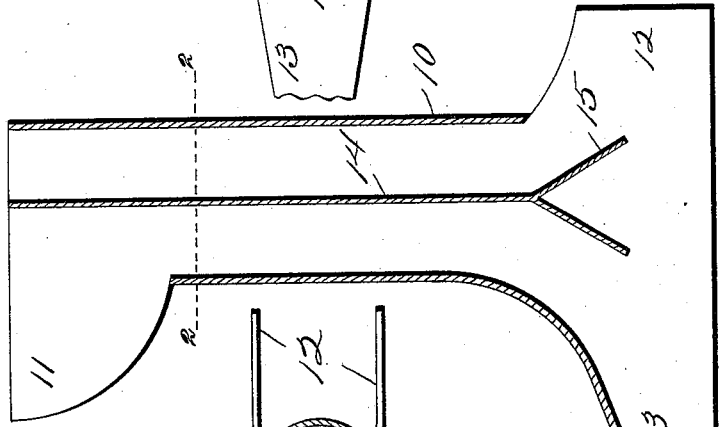
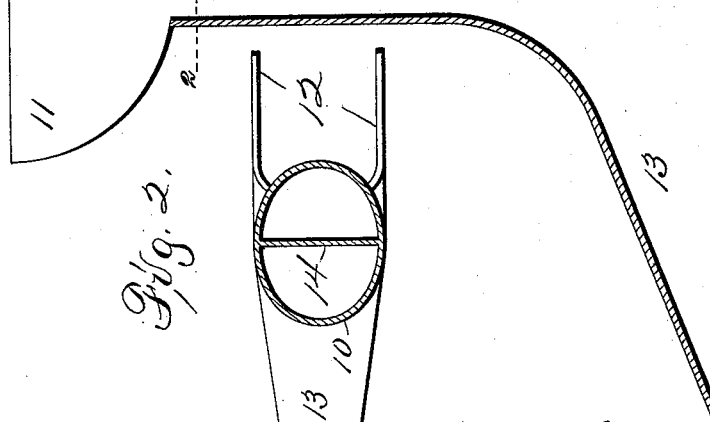
Witnesses:
W. J. Sankey.
R. H. Orwig.
Inventor: Thomas H. Williams,
By Thomas C. and J. Ralph Orwig,
Attorneys.

UNITED STATES PATENT OFFICE.

THOMAS H. WILLIAMS, OF HURON, SOUTH DAKOTA.

POTATO-PLANTER.

SPECIFICATION forming part of Letters Patent No. 594,669, dated November 30, 1897.

Application filed June 25, 1897. Serial No. 642,352. (No model.)

*To all whom it may concern:*

Be it known that I, THOMAS H. WILLIAMS, a citizen of the United States, residing at Huron, in the county of Beadle and State of South Dakota, have invented a new and useful Improvement in Potato-Planters, of which the following is a specification.

This invention relates to and is an improvement upon a certain potato-planting machine invented by me and fully shown and described in United States Letters Patent No. 554,015, issued February 4, 1896.

One object of my present invention is to provide a runner for machines of this class which will remove from the ground surface in its path all large clods of earth, weeds, or other substances and open a deep furrow, so that potatoes may be planted at the proper depth and uniformly and in such a manner that they will not be pulled from the ground nor disturbed by the clods of earth, weeds, &c., before they are covered, it being understood that heretofore in machines of this class where the runners pressed the weeds, &c., into the furrow the potatoes planted upon these weeds were often pulled up or displaced on account of said weeds, &c., becoming entangled by the runner and pulled up.

A further object is to provide means whereby the potatoes will be spread out in the furrow and the possibility of the potatoes being planted too closely together be reduced to a minimum.

My invention consists in certain details in the construction or conformation of the runners and in the construction and 'combination, with the planter-legs, of means for spreading potatoes, as hereinafter more fully set forth, pointed out in my claims, and illustrated in the accompanying drawings, in which—

Figure 1 shows a vertical sectional view of my preferred form of runner and legs. Fig. 2 shows a transverse sectional view of the same through the line 2 2 of Fig. 1. Fig. 3 shows a vertical sectional view of a modified form of runners and leg, and Fig. 4 shows a transverse sectional view through the line 4 4 of Fig. 3.

Referring to the accompanying drawings, it will be observed that the general outline of the leg (indicated by the reference-numeral 10) is oval in horizontal section, and that at its top the flat extensions 11 are formed to provide means whereby the leg may be secured to the planter-frame. At its rear lower end the leg is open and flattened out to form the landsides 12, and at its lower front end it is formed into a furrow opener or runner 13, which differs from the usual runner in that its bottom edge is flat and its top edge is inclined or tapered toward its front end, where it terminates with a sharp point.

The mechanism for cutting the potatoes is located directly above the upper end of the leg, and as the machine is advanced the potatoes are discharged into the leg. The reference-numeral 14 indicates a partition or vertical diaphragm extended through the central portion of the leg transversely of the machine from the top of the leg to a point near its lower end, and at the lower end of this diaphragm 14 is a spreader 15, of inverted-V shape, which also extends across the interior of the leg. This spreader is located within the leg at the point where the leg begins to widen into the furrow-opener, and hence the said spreader will not contract the passage-way through the leg at any point.

In practical use, assuming that my improved device were attached to the machine shown and described in the hereinbefore-mentioned patent, it is obvious that the potatoes discharged into the leg would be divided by means of the partition or diaphragm 14 and that when they struck the spreader 15 the ones in the forward section of the leg would be thrown forwardly and those striking the rear of the spreader would be thrown in the opposite direction. Hence it would be almost impossible for a number of potatoes to be lodged in the furrow in close proximity to each other. It is obvious also that by means of my improved form of furrow-opener and when the device is being advanced over the ground surface the tapered end of the furrow-opener will pass under the ground surface, and should there be any weeds or lumps of earth, &c., in the path of the furrow-opener they will be pulled up and thrown into the said leg, and in contradistinction to the operation of the usual form of furrow-openers, which curve upwardly in passing over weeds, &c., that are lodged in the ground, the said weeds will be forced downwardly and the potatoes planted on top of them.

In the modified form shown in Fig. 4 the upright or leg of the device is made rectangular in cross-section instead of oval, and in place of a partition or diaphragm in the leg I have provided a number of pins 16 in staggered positions relative to each other to intercept the passage of potatoes through the leg and distribute them so that some of them will pass to the rear and some to the front of the leg. Then they will strike upon the spreader 15 and be distributed in the same manner as hereinbefore described.

I claim as my invention—

1. The combination with a potato-planter, of a hollow leg designed to be secured to the frame of a machine and having on its lower end a furrow-opener substantially straight on its lower edge, and having its front tapered to a point, landsides at its rear, separating means within the leg above the spreader, and an inverted-V-shaped spreader at the bottom of the leg, all arranged and combined substantially in the manner set forth and for the purposes stated.

2. The combination with a potato-planter, of a hollow leg, designed to be secured to the frame of the machine and having on its lower end a furrow-opener substantially straight on its lower edge and having its front tapered to a point, landsides at its rear, a vertical central partition or diaphragm within the hollow leg, and an inverted-V-shaped spreader at the lower end of the partition, all arranged and combined substantially in the manner set forth and for the purposes stated.

THOMAS H. WILLIAMS.

Witnesses:
A. W. WILMARTH,
M. H. HILL.